Jan. 16, 1962 T. F. CULL ETAL 3,016,625
CLEANING ATTACHMENT FOR DRY CLEANING RECLAIMERS
Filed June 18, 1958
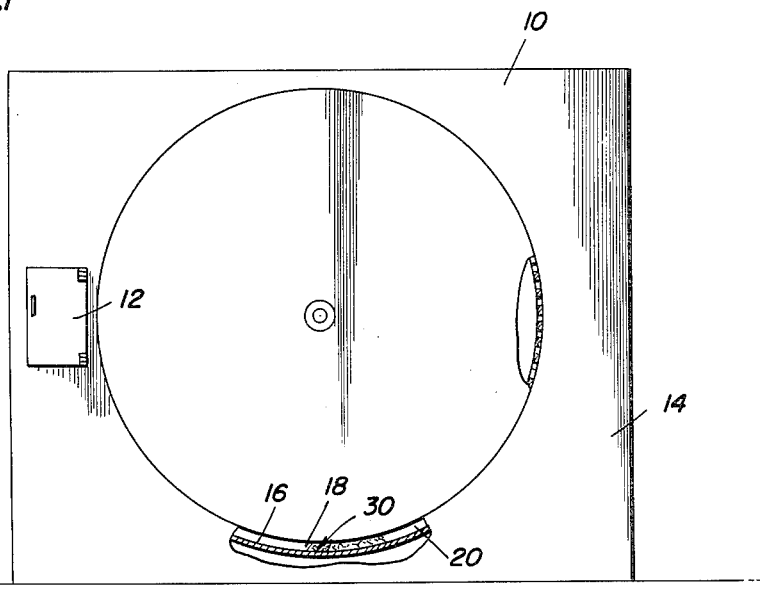
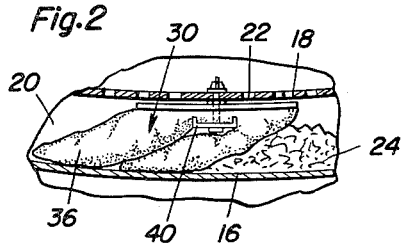
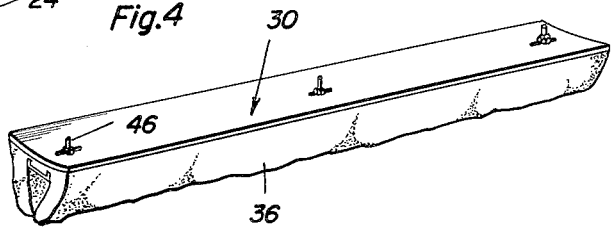
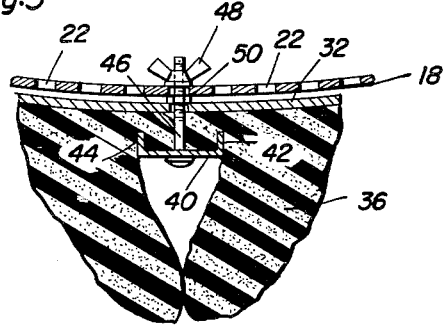
Thomas F. Cull
Robert G. Leiteritz
INVENTORS

United States Patent Office 3,016,625
Patented Jan. 16, 1962

3,016,625
CLEANING ATTACHMENT FOR DRY CLEANING RECLAIMERS
Thomas F. Cull and Robert G. Leiteritz, both of 14 E. 16th St., Chicago Heights, Ill.
Filed June 18, 1958, Ser. No. 742,768
7 Claims. (Cl. 34—85)

This invention relates to improvements in home drier, commercial drier and dry cleaning reclaimer tumblers and more particularly to an attachment which materially reduces the time and effort involved in maintaining such tumblers in proper, clean operating condition. Although the principles of the invention are applicable to home, commercial and industrial drier tumblers, the following description deals principally with dry cleaning tumblers and is intended only to exemplify one of the many embodiments and use of the invention.

Tumblers are all manufactured to operate on basically the same principle, which is a revolving meshed basket suspended inside an outer shell. Lint, buttons and various bits of debris which originally come from the garments placed in the tumbler, have a tendency to drop through the meshed openings in the basket and collect on the bottom of the jacket wall. In a short time this debris can be built up on the bottom to such an extent to cause an objectionable condition for a number of reasons. First as the basket revolves in normal operation the lint can collect and adhere to cover the small space between the basket and jacket wall and be redeposited on the garments being processed. Most tumblers have a clean out door and it is standard practice to remove this door and fish out the collection of lint and articles that become accumulated therein. This method is time-consuming and not very effective against the aforementioned accumulation of debris.

This invention provides an attachment for the basket which is rotatable with the basket and which sweeps across the surface of the jacket wall. By virtue of the attachment the debris, lint, etc. can be moved in a matter of seconds to the lint tray door or clean out door through which the debris can be removed readily and easily. Alternatively the tumbler fan can be used to blow the debris into the lint tray where it is removed quite simply.

It is pointed out that great lengths are required, usually an hour, to clean the jacket between the tumbler basket and jacket wall. Another practice, aside from the one described above, is to use steam under pressure. Here again this is time consuming procedure and not near so effective as the cleaning of the jacket between the tumbler and casing wall of the dry cleaning reclaimer tumblers or dryers.

The invention is embodied in a very pliable attachment which is secured to the basket and which sweeps across the surface of the shell for the basket. It is preferred that the attachment be made of a backing with a quick connect and disconnect fastener or group of fasteners to attach the backing to the outside surface of the basket. A sponge rubber or like soft pliant pad is on the backing and presses rather firmly against the shell wall to sweep the debris, lint and the like around with the basket as it rotates. Only one revolution of the basket is required to perform a complete cleaning job thereon. This is so because this is all that is necessary to sweep the entire surface of the shell wall and move the debris to the cleanout door or lint trap or both for manual removal.

These together with other objects and advantages which will become subsequently apparent reside in the details of construction as more fully hereinafter described and claimed, reference being had to the accompanying drawings forming a part hereof, wherein like numerals refer to like parts throughout, and in which:

FIGURE 1 is a front elevational view of a dry cleaning reclaimer tumbler or drier, parts of the tumbler broken away to illustrate otherwise hidden details;

FIGURE 2 is an enlarged sectional view showing a part of the basket, the jacket between the basket and the shell wall, and an attachment in operation in the jacket;

FIGURE 3 is a cross sectional view showing the attachment and a part of the basket wall separated from the tumbler; and FIGURE 4 is a perspective view of the attachment.

In the accompanying drawings there is a conventional tumbler or drier 10 which has an access door 12. The tumbler is ordinarily constructed of a structural support, as a casing 14 having a shell that includes a cylindrical wall 16. The shell wall has an inner surface spaced from the outer cylindrical wall of basket 18 thereby forming annular jacket 20. The basket is perforated having a plurality of regularly spaced openings 22 for free flow of air. The jacket 20 ordinarily accumulates an appreciable quantity of lint 24, buttons, pins and other debris. The more difficult debris to remove is the lint that adheres tenaciously to the surface of the shell wall 16.

This invention has an attachment 30 (FIGURE 4) which is adapted to be secured to the basket wall, extending transversely across the jacket 20 and sweeping on the inside surface of the shell wall 16. This propels the lint and other debris in the jacket 20 to a position where it can be easily removed through access door 12. Moreover, the attachment removes the ordinarily difficult film of lint that adheres to the surface of the shell wall together with the larger particles of lint.

The attachment 30 is made of a backing 32 such as a flat panel and preferably slightly curved in cross section to conform to the general curvature of the wall of the basket. A soft, pliant pad 36 is attached to backing 32 extending lengthwise of the backing. There are several materials of construction that can be used for the pad 36, one being sponge rubber made of natural or synthetic rubber, foam rubber, plastic or synthetic resinous rubbers or rubber-like material. An elongate channel 40 has its sides, or flanges, 42 and 44 in a position that they confront the backing 32 and engage in a central portion of the material of the pad 36 to compress said portion and hold it firmly attached to the backing. A plurality of bolts 46 are passed through holes in the channel 40, holes in the backing 32 and selected openings 22. Wing nuts 48 are on the bolts 46 holding them attached to the basket wall. The channel and bolts together with nuts 48 constitute the means for attaching the attachment to the basket, and additional nuts 50 on the bolts engaging the outer surface of backing 32, cooperate with the bolts and channel 40 to constitute the means by which to fasten the pad 36 to its backing 32. The nuts 50 space the backing 32 from the basket 18 to prevent said backing from closing openings 22 in the basket.

The foregoing is considered as illustrative only of the principles of the invention. Further, since numerous modifications and changes will readily occur to those skilled in the art, it is not desired to limit the invention to the exact construction and operation shown and described, and accordingly all suitable modifications and equivalents may be resorted to, falling within the scope of the invention as claimed.

What is claimed as new is as follows:

1. In a tumbler having a cylindrical shell and a rotary perforated cylindrical basket in the shell forming therewith an annular jacket, a soft pliant pad in said jacket engaging the shell, a backing panel for one side of the pad between the basket and the pad and curved in conformity with said basket, an elongated member on the other side of said pad traversing said basket and a central portion of said pad, and fasteners attached to said basket through its perforations and clampingly engaging said panel and member with the central portion of the pad to compress said central portion between the panel and member and whereby said pad at opposite sides of said member will sweepingly engage said shell in response to rotation of said basket.

2. The combination of claim 1, said member comprising a channel with opposite side flanges engaged with said pad for compressing said pad.

3. The combination of claim 1, said fasteners spacing the panel from the basket to prevent said panel from closing openings in the basket.

4. In a laundry machine having a cylindrical shell and a rotary cylindrical basket mounted in said shell and forming therewith an annular jacket, said rotary cylindrical basket having a side wall which is perforated and which is cylindrical throughout the entire area thereof, a cleaning element disposed in said jacket and including a backing panel having removable attaching means cooperating with perforations of said cylindrical side wall and located in spaced relation thereto, to thereby mount the entire cleaning element on the exterior of said cylindrical basket, and a portion of said cleaning element remote from said basket contacting the inner surface of said cylindrical shell and sweeping the same when said rotary cylindrical basket is rotated.

5. The subject matter of claim 4 wherein said attaching means includes a plurality of fasteners operatively connected to hold said cleaning element separated from and attached to said side wall of said rotary cylindrical basket.

6. A sweeping attachment for a laundry machine having a rotary basket with perforations therein in spaced relation to a shell comprising backing means, cleaning means mounted on said backing means and in contact with said shell, removable fastener means extending through selected perforations of said basket and clamp means operatively connected to said fastener means and backing means to maintain said cleaning means in spaced relation to said basket and thereby avoid blockage of perforations other than those through which the fastener means extend.

7. The combination of claim 6, wherein said clamp means comprises, mounting means maintained in spaced relation to the basket by the fastener means, and securing means engageable with the backing means for clamping thereof to the mounting means in response to locking the fastener means to the basket through the selected perforations therein.

References Cited in the file of this patent

UNITED STATES PATENTS

| | | |
|---|---|---|
| 1,165,774 | Grambauer | Dec. 28, 1915 |
| 2,140,200 | Finkel | Dec. 13, 1938 |
| 2,718,711 | Clark | Sept. 11, 1955 |

FOREIGN PATENTS

| | | |
|---|---|---|
| 122,787 | Germany | July 29, 1901 |